C. THOMAS.
Thill-Coupling.
No. 100,951.
Patented Mar. 15, 1870.
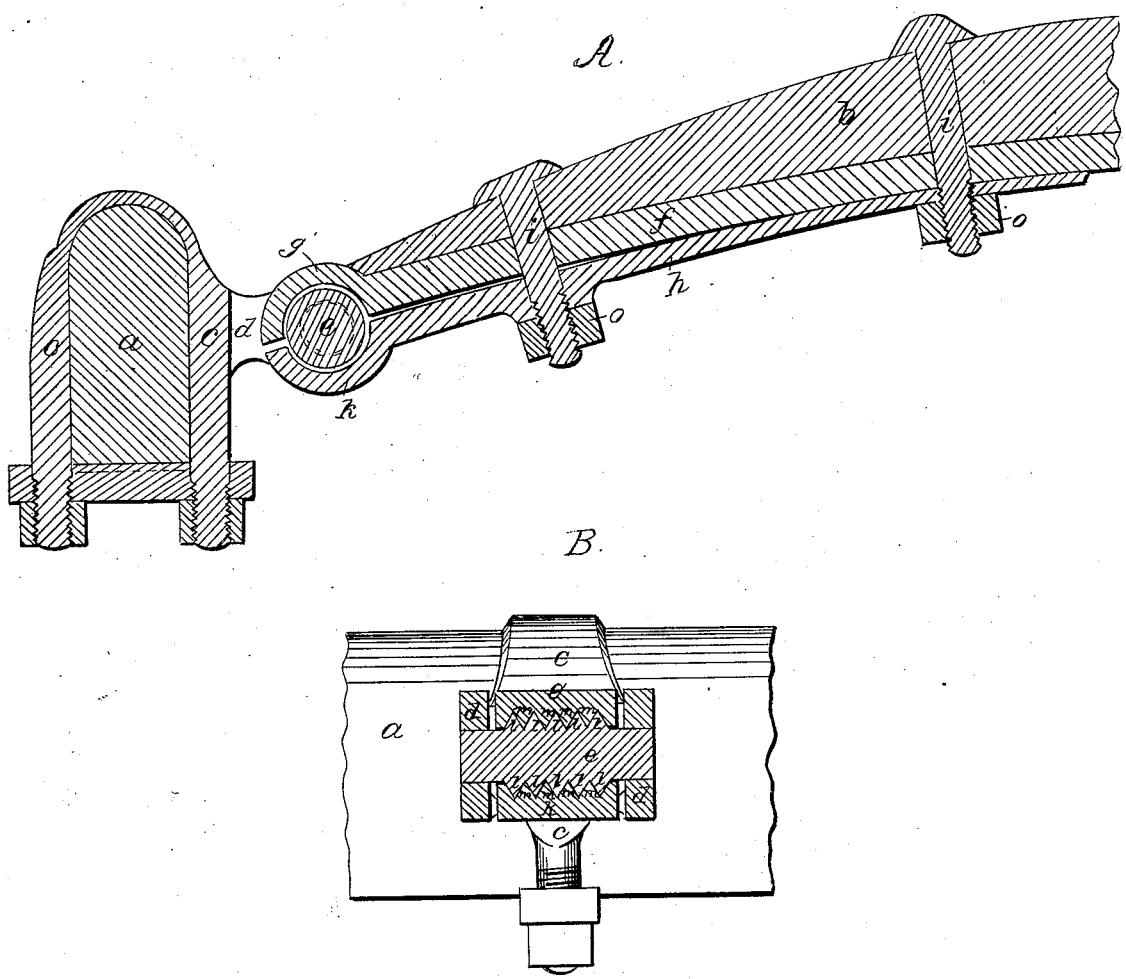

United States Patent Office.

CHAUNCEY THOMAS, OF BOSTON, MASSACHUSETTS.

Letters Patent No. 100,951, dated March 15, 1870; antedated March 3, 1870.

IMPROVED THILL-COUPLING.

The Schedule referred to in these Letters Patent and making part of the same.

*To all whom it may concern:*

Be it known that I, CHAUNCEY THOMAS, of Boston, in the county of Suffolk, and State of Massachusetts, have invented an Improved Carriage-Shaft Coupling; and I do hereby declare that the following, taken in connection with the drawings which accompany and form part of this specification, is a description of my invention sufficient to enable those skilled in the art to practice it.

The invention relates to the method of attachment of shafts to light vehicles, with reference to such connection as shall render the parts less liable to wear from shaking, and free from the rattle inherent to the common method of coupling the shaft by means of a bolt and nut.

My invention consists in combining with the joint pin (connected to the axle) two jaw pieces, (applied to the shaft,) the shank of one of these jaws being a strong steel spring, by the stress of which (regulated by suitable screws, or nuts and screws,) the pin is grasped by the jaws to make as tight a coupling as may be necessary.

The invention also consists in making the contiguous surfaces of the jaws and pin with interlocking teeth or projections, to prevent lateral movement of the respective parts.

The drawings represent a shaft coupling embodying my improvement.

A shows a section of the coupling through the center of the shaft.

B, a cross-section through the center of the joint-pin.

$a$ denotes the portion of the axle to which the shaft is connected.

$b$, the shaft.

$c$, a strap, embracing the shaft, and having projecting from its front part two ears, $d$, which support the joint-pin $e$.

To the under side of the shaft $b$ a shaft-iron, $f$, is applied, at the end of which iron I form a concave jaw, $g$, fitting upon the upper half of the pin $e$.

The under surface of the iron $f$ is made slightly curved, as seen at A, and to this surface I apply a steel spring, $h$, which is straight or nearly straight, the iron $f$ and spring $h$ being fastened together and to the shaft by screw-bolts $i$ and nuts $o$.

The outer end of the spring $h$ is made with a jaw, $k$, corresponding to the jaw $g$, and fitting upon the lower side of the joint-pin $e$, as seen in the drawings.

The two jaws $g$ $k$ clasp the pin, but the jaws do not meet, and by turning up the nuts $i$, and forcing the spring $h$ toward the iron $f$, the clasp of the jaws will be tightened, as will be readily understood.

By this means the connection may be always kept tight and noiseless.

To prevent contact between the ends of the jaws and the inner surfaces of the ears $d$, or lateral movement of the respective parts, I make the pin $e$ with threads or projections, $l$, upon its outer surface, and the inner surface of either or both of the jaws is formed with corresponding teeth or projections, $m$, which, interlocking with the threads $l$, keep the jaws and pins relatively stationary so far as lateral movement is concerned.

It is a great desideratum, especially in light carriages used for pleasure or for family riding, to have a carriage with noiseless connections, as well as one in which the connections are enduring, and it will be obvious that these results are attained by the construction and arrangement of the coupling mechanism shown.

I claim—

In combination with clasping jaws, the interlocking teeth or projections, substantially as described.

Also, in combination with the clasping jaws $g$ $k$, having teeth or projections to interlock with those upon the joint-pin, the means, substantially as described, for regulating the pressure of the jaw upon the joint-pin.

CHAUNCEY THOMAS.

Witnesses:
J. B. CROSBY,
FRANCIS GOULD.